United States Patent
Kraft et al.

(10) Patent No.: US 6,516,312 B1
(45) Date of Patent: Feb. 4, 2003

(54) SYSTEM AND METHOD FOR DYNAMICALLY ASSOCIATING KEYWORDS WITH DOMAIN-SPECIFIC SEARCH ENGINE QUERIES

(75) Inventors: Reiner Kraft, Gilroy, CA (US); Gaurav Tewari, Cambridge, MA (US)

(73) Assignee: International Business Machine Corporation, Armonk, NY (US)

(*) Notice: Subject to any disclaimer, the term of this patent is extended or adjusted under 35 U.S.C. 154(b) by 0 days.

(21) Appl. No.: 09/542,529

(22) Filed: Apr. 4, 2000

(51) Int. Cl.[7] ............................................. G06F 17/30
(52) U.S. Cl. .................. 707/3; 707/1; 707/2; 707/4; 707/5; 707/6; 707/10
(58) Field of Search .................................. 707/1–6, 10

(56) References Cited

U.S. PATENT DOCUMENTS

| | | | |
|---|---|---|---|
| 5,867,678 A | 2/1999 | Amro et al. ................ | 345/347 |
| 5,983,237 A * | 11/1999 | Jain et al. .................... | 707/104 |
| 6,006,225 A * | 12/1999 | Bowman et al. ............... | 707/5 |
| 6,026,409 A | 2/2000 | Blumenthal ................ | 707/104 |
| 6,182,065 B1 * | 1/2001 | Yeomans ...................... | 707/3 |
| 6,370,543 B2 * | 4/2002 | Hoffert et al. ........... | 707/104.1 |

\* cited by examiner

*Primary Examiner*—Kim Vu
*Assistant Examiner*—Hung Pham
(74) *Attorney, Agent, or Firm*—Samuel A. Kassatly

(57) ABSTRACT

A computer program product is provided as a system for use with a search engine and a search engine repository to dynamically associate keywords within a search result set encountered in an abstract of a search result item with a domain-specific query. In the system, a local query database stores the domain-specific query, and a synchronization unit synchronizes the search engine repository and the local query database. A query builder builds a search query from a query template using the search engine repository. A summary marker incorporates the search query with the keyword in the abstract of the search result item. A keyword detector generates a list of keywords included in a domain-specific dictionary. A search result calibration manager calibrates the number of the query result items. A search result item buffer receives a request for processing an abstract metadata item from the synchronization unit. The request includes a Universal Resource Locator (URL) and a corresponding abstract, wherein the query builder uses a (URL, keyword) pair to build the domain-specific query from the query template. The summary marker updates the abstract corresponding to the URL in the search engine repository, and marks and inserts the domain-specific query for all occurrences of the keyword.

28 Claims, 8 Drawing Sheets

SEARCH RESULTS

1) Re: Problem with RMI
From: comp.lang.java.programmer
Date: 17 Aug 1998 16:20:38   Author: Michael Cardon
[Details]

2) TCP/IP or RMI?
From: comp.lang.java.programmer, comp.lang.java.tech
Date: 19 Aug 98 07:31:54   Author: Kent Johansson
[Details]

3) Re: JDBC/RMI
From: comp.lang.java.programmer
Date: Mon, 17 Aug 1998   Author: Srikanth   [Details]

4) Problem with RMI
From: comp.lang.java.programmer
Date: Mon, 17 Aug 1998   Author: Anton Riedl   [Details]

5) Re: RMI error msg
From: comp.lang.java.help
Date: Tue, 18 Aug 1998   Author: aoSZoMBie   [Details]

FIG. 6A

SEARCH RESULTS

1) Re: Problem with RMI
   From: comp.lang.java
   Date: 17 Aug 1998 10... 
   [Details]

> Remote Method Invocation:
   > (RMI) Part of the Java programming language library which enables a Java program running on one computer to access the objects and methods of another Java program running on a different computer.

2) TCP/IP or RMI?
   From: comp.lang.java.programmer
   Date: 19 Aug 98 07:3...
   [Details]

3) Re: JDBC/RMI
   From: comp.lang.java.programmer
   Date: Mon, 17 Aug 1998   Author: Srikanth   [Details]

4) Problem with RMI
   From: comp.lang.java.programmer
   Date: Mon, 17 Aug 1998   Author: Anton Riedl   [Details]

5) Re: RMI error msg
   From: comp.lang.java.help
   Date: Tue, 18 Aug 1998   Author: aoSZoMBie   [Details]

FIG. 6B

SEARCH RESU— 402
400

1) Re: Problem with RMI
From: comp.lang.java.
Date: 17 Aug 1998 16:2 | Remote Met
[Details]                   (RMI) Part o
                            language lib
2) TCP/IP or RMI?           program ru
From: comp.lang.java.       access the objects and methods of
Date: 19 Aug 98 07:31:      another Java program running on a
[Details]                   different computer.

object:
In object-oriented programming, a
unique instance of a data structure
defined according to the template
provided by its class.

3) Re: JDBC/RMI
From: comp.lang.java.programmer
Date: Mon, 17 Aug 1998   Author: Srikanth   [Details]

4) Problem with RMI
From: comp.lang.java.programmer
Date: Mon, 17 Aug 1998   Author: Anton Riedl   [Details]

5) Re: RMI error msg
From: comp.lang.java.help
Date: Tue, 18 Aug 1998   Author: aoSZoMBie   [Details]

FIG. 6C

SYSTEM AND METHOD FOR DYNAMICALLY ASSOCIATING KEYWORDS WITH DOMAIN-SPECIFIC SEARCH ENGINE QUERIES

FIELD OF THE INVENTION

The present invention relates to the field of data processing, and particularly to a software system and associated method for use with a search engine, to search data maintained in systems that are linked together over an associated network such as the Internet. More specifically, this invention pertains to a computer software product for dynamically associating keywords encountered in abstracts or summaries of a search result set, with domain-specific search engine queries, in order to retrieve resources pertaining to the keywords within the context of a current information sphere.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. The vastness of the unstructured WWW causes users to rely primarily on Internet search engines to retrieve information or to locate businesses. These search engines use various means to determine the relevance of a user-defined search to the information retrieved.

The authors of web pages provide information known as metadata, within the body of the hypertext markup language (HTML) document that defines the web pages. A computer software product known as a web crawler, systematically accesses web pages by sequentially following hypertext links from page to page. The crawler indexes the pages for use by the search engines using information about a web page as provided by its address or Universal Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

A typical search engine has an interface with a search window where the user enters an alphanumeric search expression or keywords. The search engine sifts through available web sites for the user's search terms, and returns the search of results in the form of HTML pages. Each search result includes a list of individual entries that have been identified by the search engine as satisfying the user's search expression. Each entry or "hit" includes a hyperlink that points to a Uniform Resource Locator (URL) location or web page.

In addition to the hyperlink, certain search result pages include a short summary or abstract that describes the content of the URL location. Typically, search engines generate this abstract from the file at the URL, and only provide acceptable results for URLs that point to HTML format documents. For URLs that point to HTML documents or web pages, a typical abstract includes a combination of values selected from HTML tags. These values may include a text from the web page's "title" tag, from what are referred to as "annotations" or "meta tag values" such as "description," "keywords," etc., from "heading" tag values (e.g., H1, H2 tags), or from some combination of the content of these tags.

However, for one HTML parent page with links to multiple different relevant non-HTML documents that satisfy the user's search criteria, the search result may include multiple identical URLs, one for each relevant non-HTML document. Each of these identical URLs points to the same HTML parent page, and each may include an identical abstract that is descriptive of the parent HTML page. As a result, the search results in redundant abstracts that can be practically useless, distracting, and time consuming to review.

More specifically, the popularity of domain-specific portal sites, that act as gateways to very specialized information sources, has grown concurrently with the WWW, both in complexity and volume of data. The term "portal" is generally synonymous with gateway, and is typically used to refer to a WWW site which is intended to be a major starting site or as an anchor site for web users. Current leading general-purpose portal sites include: Yahoo!®, Excite®, Netscape®, Lycos®, Cnet®, and MSN The Microsoft Network®. However, while such portal sites attempt to serve as gateways to a wide variety of general-purpose information, specialized portals have also been gaining popularity in recent years.

Specialized portal sites, such as the jCentral®, xCentral, etc., attempt to focus on a particular domain that appeals to a target audience. By limiting the scope of their operation, the belief is that specialized portal sites will be able to present information of greater relevance to their target audience.

For example, in a portal site such as jCentral® that caters to users interested to learn more about the Java programming language and related topics, the users are allowed to conduct a search by querying the portal database. The portal database is a vast repository of pre-collected, indexed, and summarized information, typically gathered from the WWW using automated crawling tools. When a user enters a query, the portal's search engine attempts to match the keywords specified by the user with summarized metadata that have been previously extracted from the documents stored in the repository, and then returns an ordered list of potential candidate matches relevant to the user's query.

Typically, the search engine will return a result set for a search query including a URL and a text based abstract of the original resource. Sometimes, users are able to control the length of the abstract. For instance, the HotBot® site at URL: http://www.hotbot.com, provides the choice of having only a list of URLs displayed as the search result, the URL with a brief abstract, or a comprehensive abstract.

However, since the abstract is usually generated on the server side, a resulting problem is the inability of the users to obtain more detailed information pertaining to domain-specific terms that appear in the abstract, without issuing a separate query with the relevant term as the new keyword. By so doing, the user might become distracted and distanced from the original search result. Moreover, the conventional search engines do not provide the capability to allow users to dynamically conduct an automatic search based on keywords that appear in an abstract or summary. Rather, the full text of the abstract or summary is displayed to the user.

There is currently no adequate mechanism by which search engines allow the user to dynamically interface with the search abstract, such as by selecting a term of interest in the abstract to obtain more information about this term within the context of the domain being queried. The need for such a mechanism has heretofore remained unsatisfied.

SUMMARY OF THE INVENTION

The abstract keywords association system and associated method of the present invention satisfy this need. In accordance with one embodiment, the abstract keywords association system allows the user to dynamically interface with the search abstract. The user selects a term of interest in the abstract, and the abstract keywords association system automatically provides the user with additional information about this term within the context of the domain being queried. This permits the user to consider more information and to better judge the usefulness of the resource and search result.

The abstract keywords association system of the present invention provides several features and advantages, among which are the following:

The ability to automatically detect and select keywords from abstracts of search result items, by using a domain-specific dictionary of keywords.

The ability to select and generate an optimal query string for a particular keyword. This comprises the steps of building a complex Boolean query string, and calibrating the quantity of the search result set to a manageable size.

A method to dynamically link domain-specific terms encountered in abstract summaries of web resources returned in response to search engine queries, to new queries that retrieve resources specific to keywords in the context of the current information domain. The positions at which a hyperlink is inserted are marked using specific markup tags.

The ability to update, remove, change, or add inserted hyperlinks, when a related domain-specific dictionary changes.

A synchronization mechanism to keep the stored query information up to date. This involves the detection of changes in the summary metadata, as well as changes in the usage pattern of the search engines used, which leads to the creation of a new query string.

A mechanism that controls the abstract keywords association system based on the user's input and events.

The foregoing and other features and advantages of the present invention are realized by an abstract keywords association system for use with a search engine and a search engine repository to dynamically associate a keyword encountered in an abstract of a search result set with a domain-specific query. In this system, a local query database stores the domain-specific query, and a synchronization unit synchronizes the search engine repository and the local query database.

A query builder builds a search query from a query template using the search engine repository. A summary marker incorporates the search query with the keyword in the abstract of the search result item. A keyword detector generates a list of keywords included in a domain-specific dictionary. A search result calibration manager calibrates the number of the query result items. A search result item buffer receives a request for processing an abstract metadata item from the synchronization unit. The request includes a Universal Resource Locator (URL) and a corresponding abstract, wherein the query builder uses a (URL, keyword) pair to build the domain-specific query from the query template. The summary marker updates the abstract corresponding to the URL in the search engine repository, and marks and inserts the domain-specific query for all occurrences of the keyword.

The abstract keywords association system of the present invention enables users to read and learn more on specific terms encountered in abstract summaries of web resources returned by domain-specific search engines. The system allows the user to dynamically probe the information presented, and thus obtain the desired detail. This permits the user to gather and access information faster and with greater convenience.

The abstracts presented by the abstract keywords association system contain dynamic data associated with keywords derived from the domain-specific dictionary. The dynamic data represents pointers, links, or URLs to external data repositories. As a result, the retrieved data is always current and up to date.

If a meta search engine were used, the search results for the keywords could contain various different categories. For example, books related to the keyword, reviews from other users about the keyword, links to web sites etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 6 is comprised of FIGS. 6A, 6B, and 6C, and represents three exemplary screen views that illustrate a hypothetical search using the abstract keywords association system of FIGS. 1–4.

DETAILED DESCRIPTION OF THE INVENTION

Figure 1:
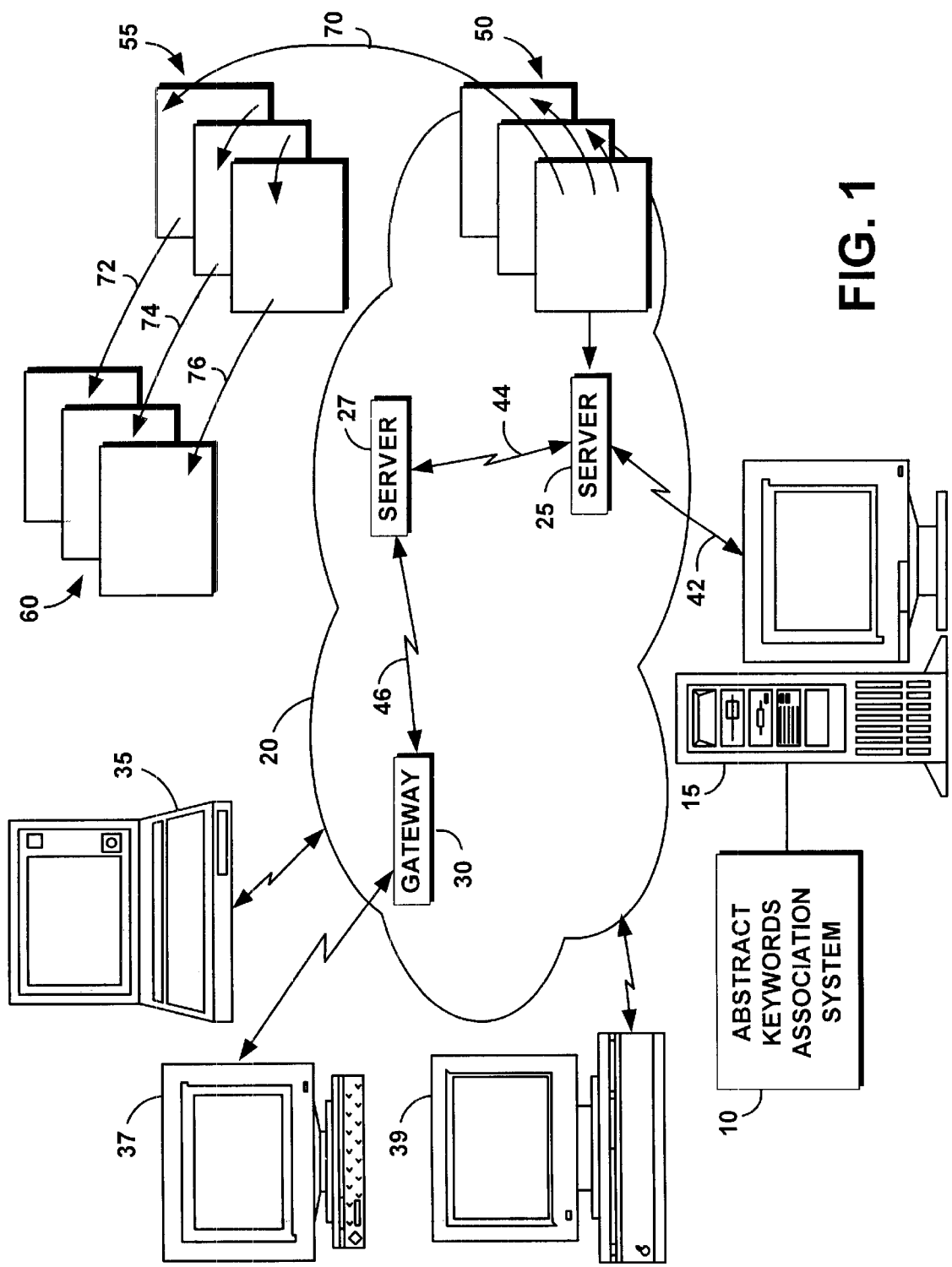
FIG. 1 is a schematic illustration of an exemplary operating environment in which an abstract keywords association system of the present invention can be used.

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

Dictionary: A database of context-related terms.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client-server hypertext distributed information retrieval system.

FIG. 1 portrays the overall environment in which an abstract keywords association system 10 according to the present invention may be used. The system 10 includes a software or computer program product which is typically embedded within, or installed on a host server 15. Alternatively, the system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
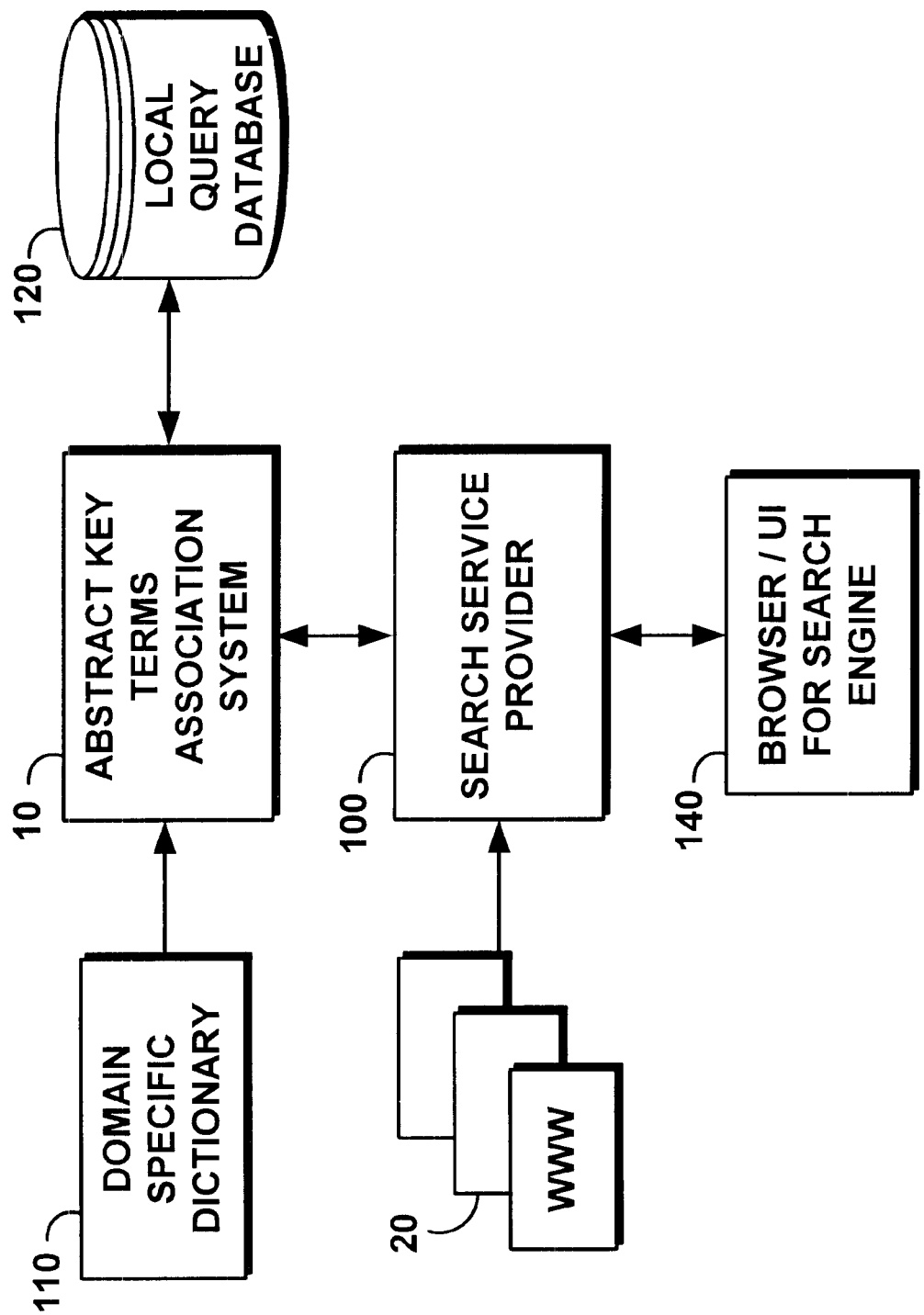
FIGS. 2, 3, and 4 are block diagrams that illustrate a high level architecture of the abstract keywords association system of FIG. 1 shown used in the context of an Internet search.

FIG. 2 illustrates a high level architecture showing the system 10 used in the context of an Internet search. The abstract keywords association system 10, transparently to the user, continuously or periodically operates in the background to prepare and update query strings associated with keywords provided by one or more domain specific repositories such as a dictionary, a thesaurus, etc. 110. These query strings and the associated keywords are indexed and stored in a local query database 120.

As an example, a user uses a browser or a user interface (UI) 140 to enter a search query which is transmitted to a search service provider 100. In turn, the search service provider 100, having already accessed the WWW 20, searches the metadata stored in the local query database, and submits the search result set to the user.

The search result set includes a list of URLs associated with brief abstracts describing the nature of the resources found, and the relevant query strings. For example, suppose a hypothetical user is interested in searching for documents related to "RMI" in the jCentral® site portal. In response to this query, a hypothetical document abstract may read as follows: "RMI is a Java specific technology that allows the development of distributed applications and offers numerous advantages over CORBA . . . ".

Once the user reads the first few words he/she might, wish to obtain more information about the keywords: "RMI" and "CORBA", within the overall context of Java. This additional information will provide the user with a better understanding of the meaning of these keywords and the abstract and will therefore enable the user to make a more informed decision as to the usefulness of the resulting search abstract.

The additional dynamic information can be represented in a pop-up window, such that the original search result set is still readable. In the example illustrated in FIG. 6, the information is provided in a pop-up-window for a specific keyword. This information is not static, rather, as the search engine repository changes, or if the search service provider adds new search capabilities (e.g. for enhanced search accuracy), the search result set displayed to the user will adapt these changes. In summary, the abstract keywords association system 10 associates live domain specific information to keywords in the abstracts of the search result items.

Figure 3:
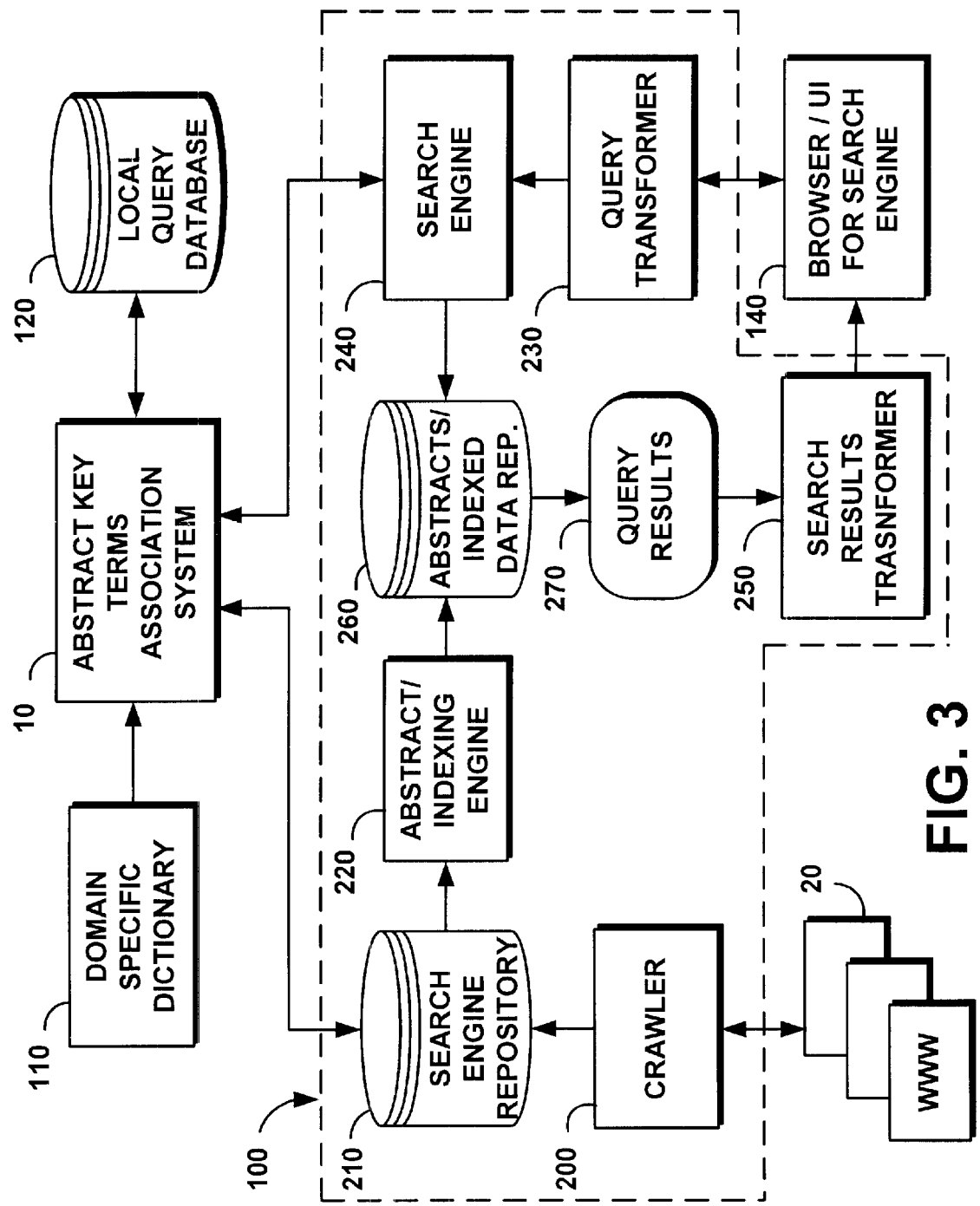

A search service provider 100 will now be described in more detail with further reference to FIG. 3. The search service provider 100 is generally comprised of a web crawler 200, a search engine repository 210, an abstract/indexing engine 220, a query transformer 230, a search engine 240, a search results transformer 250, and an abstracts/indexed data repository 260.

In use, the crawler 150 crawls the WWW 20 and downloads web documents to the search engine repository 210 where they are stored and updated systematically. The abstract/indexing engine 220 indexes the web documents and generates abstracts therefrom. The abstracts and the indexed data are stored in the abstracts/indexed data repository 260 for later use by the search engine 240, as appropriate.

The search engine repository 210 is a data store which is maintained by a web information gatherer such as the web crawler 200. The search engine repository 210 maintains information or metadata from previously encountered web pages, which metadata is used by the abstract/indexing engine 220 to prepare the abstracts. Preferably, the search engine repository 210 is maintained centrally by the search service provider 100. Alternatively, the search engine repository 210 may be located and maintained on an independently provided system to which the search service provider 100 has access. In addition, while the system 10 is described as including two repositories 210 and 260, it should be clear these two repositories 210 and 260 could be functionally combined in a single database.

The abstract/indexing engine 220 generates an abstract for each web document from the metadata stored in the search engine repository 210. While the abstract/indexing engine 220 is illustrated in FIG. 3 as being a single component, it should be clear that the abstract/indexing engine 220 could be functionally separated into two distinct engines: an abstract engine and an indexing engine.

The query transformer 230, prompted by the user browser 140, applies an internal query request to the abstracts/indexed data stored in the abstracts/indexed data repository 260, and generates a search result with matches (or query results) 270 that are specific to the user's query. As it will be explained later in greater detail in connection with FIG. 4, when a user enters a search query, the abstract/indexing engine 220 presents search abstracts with embedded query strings for each keyword in the search abstracts, to enable dynamic interaction with the user. The keywords are stored in the domain specific dictionary 110.

According to one embodiment, the query strings are associated with the abstracts, off-line, and the annotated abstracts are stored in the local query database 120. According to another embodiment of the present invention, the query strings are associated with the abstracts, on-line, on an almost real-time basis, as the user is conducting the search session.

Once the abstract keywords association system 10 retrieves the query results 270, the search service provider 100 transform them into viewable or browsable form (i.e., HTML) by means of the query transformer 230. The transformed query results are subsequently presented to the user at the user interface (UI) or browser 140.

Figure 4:
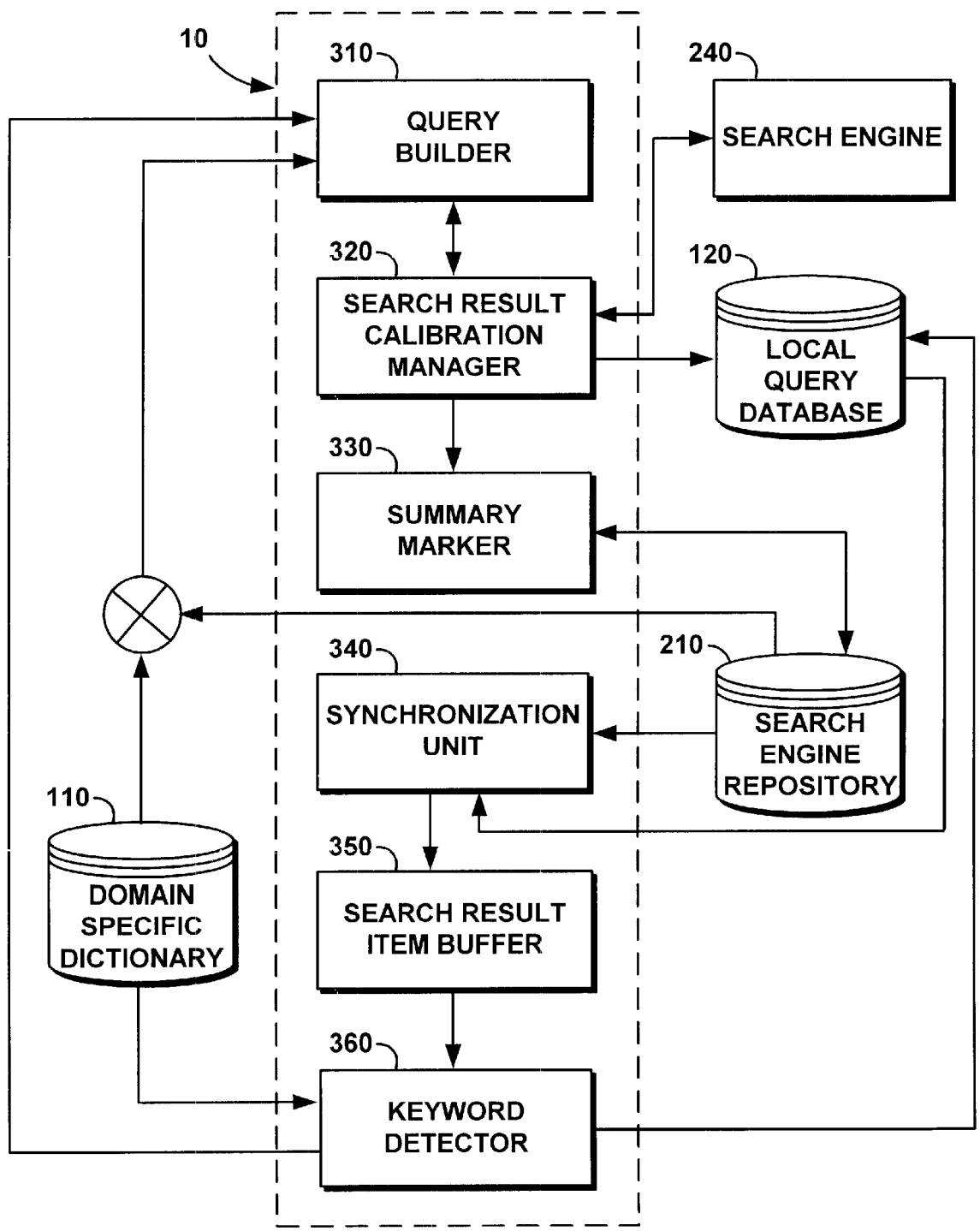

With reference to FIG. 4, the abstract keywords association system 10 generally includes a query builder 310, a search result calibration manager 320, a summary marker 330, a synchronization unit 340, a search result Item buffer 350, and a keyword detector 360. The method of operation 400 of the abstract keywords association system 10 will also be conjointly described in connection with FIG. 5.

As depicted in step 405 (FIG. 5), the synchronization unit 340 synchronizes the content of the search engine repository 210 and the local query database 120, as the search engine repository 210 is typically very dynamic, and new resources are periodically added, removed, and updated. Preferably, the direction of the synchronization is from the local query database 120 to the search engine repository 210 (FIG. 3). The abstract keywords association system 10 reacts to changes and updates of the search engine repository 210, but the local query database 120 will not trigger changes.

Initially, the synchronization unit 340 loops through all the summary data, and extracts the URLs along with the summary data. Then, it conveys this information to the search result item buffer 350 for further processing.

Subsequently, the synchronization unit 340 will respond to notifications from the search engine repository 210 according to one of the following situations:

1. A new summary metadata item from the search engine repository 210 is added to the search engine repository 210. The URL and the summary abstract are extracted from the summary and forwarded to the search result item buffer 350. The search result item buffer 350 process the new item, builds the query, and adds the query to the local query database 120.

2. A summary metadata item from the search engine repository 210 is changed. The URL and the summary abstract are extracted from the summary and forwarded to the search result item buffer 350. The local query database is updated 120 by removing keyword items for this particular URL, adding new keyword items, or updating keyword items.

3. A summary metadata item from the search engine repository 210 is removed. All references to the URL in the local query database 120 are removed.

The search result item buffer 350 receives a request for processing a summary metadata item from the synchronization unit 340. As described above, a request has a URL, along with a corresponding text-based abstract. The search result item buffer 350 synchronizes the synchronization unit 340 that acts as a producer for requests, and further synchronizes the keyword detector 360 that consumes requests. In the event there are no requests to process, the keyword detector 360 awaits the arrival of new abstracts. In summary, the search result item buffer 350 is used for synchronization purposes.

With reference to step 410 (FIG. 5), the keyword detector 360 receives a request for processing a summary metadata item from the search result item buffer 350. The keyword detector 360 loops through the text in the abstract, and creates a list of keywords that are included in (i.e., members of) the domain-specific dictionary 110. Essentially, and as shown in step 415 (FIG. 5), a query can be performed for each keyword in the dictionary 110. However, the performance of the system 10 could be improved if frequently used keywords are cached. In addition, noise words noise words could be minimized prior to performing the query.

The system 10 can follow one of two preferred approaches to generate query strings for the keywords in the dictionary 110: an exhaustive approach, or an expedient approach. In the exhaustive approach, the system 10 considers each keyword in the dictionary 110, and generates a search link for each member keyword of the dictionary 110. As a result, for each keyword, the keyword detector 360 creates a (URL, keyword) pair for each of the keywords, which will be stored in the local query database 120, and forwarded to the query builder 310, in order to construct a query string. The term "URL" is used herein to connote an address or location.

During a search session, when the keyword detector 360 detects a keyword (i.e., RMI) in the abstract, the local query database 120 is queried for that particular keyword (i.e., RMI), that is the supplemental search query for this keyword is executed to retrieve the corresponding query string from the local query database. This exhaustive approach does not require that a calibration process be performed.

The expedient approach differs from the exhaustive approach in that the system 10 does not generate a query string for each member key word of the dictionary 110. Rather, the query strings are generated on demand. During the query building process, when the keyword detector 360 detects a keyword in the abstract, the search engine 240 checks if the desired query string has already been and stored in the local query database 120. If it has, then the associated query string is retrieved. If it has not, then the system 10 generates a query string for the keyword, and stores the query string in the local query database 120.

The query builder 310 uses the (URL, keyword) pair, and builds a search query from a query template using the search engine repository 210 (step 420). A fully constructed query string is then forwarded to the search result calibration manager 320 for processing.

An initial version of the query string is first built using a single keyword, and attaching this keyword in the query template. Each keyword in the domain-specific dictionary 110 has a list of synonyms, and also a list of related words. After passing a query request to the search result calibration manager 320, which, in turn, evaluates the search query, it is possible to obtain an acceptably high number of search result items in the search result set. In this situation, the query builder 310 receives a request from the search result calibration manager 320 to modify the query string as follows:

1. If too many hits are generated, the query builder 310 adds restrictions to the query string and/or chooses different synonyms.

2. If insufficient hits are obtained, the query builder 310 removes certain restrictions from the query string and/or chooses different synonyms.

3. If the query search is not acceptable, the query builder 310 can issue a request to choose a different search service provider 100, which entails the use of a different query template and repeating the process of building a query.

The query builder 310 is mainly concerned with the generation of the query string which is based on a query template. The search result calibration manager 320 cooperates with the query builder 310 for sending query modification requests, in order to optimize the query.

Figure 5:
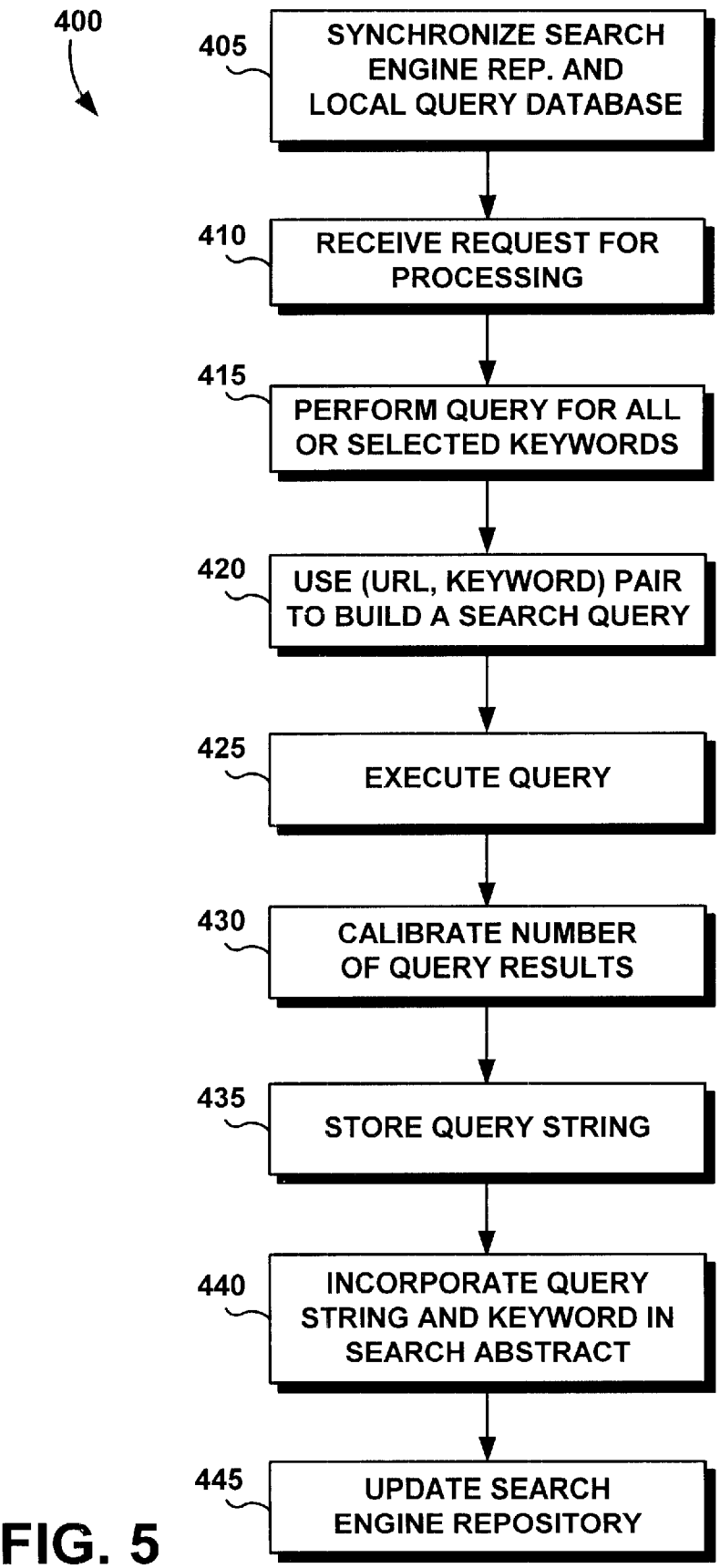
FIG. 5 is a flow chart that depicts the operation of the abstract keywords association system of FIGS. 1–4.

The search result calibration manager 320 receives a fully constructed query string from the query builder 310 and performs the actual query at step 425 (FIG. 5). The search result calibration manager 320 then calibrates the number of query results at step 430. The search result calibration manager 320 receives the query results, and then determines the number of the search result items, pursuant to a scheme description from the search engine provider 100. If the number of hits is excessive, the entire query string is automatically returned to the query builder 310 along with a request to refine the query. If the number of hits is too low, the entire query string also is automatically returned to the query builder 310 along with a request to broaden the search query. The specific upper and lower limits for the number of hits can be set by the user.

The process of calibration is repeated until the number of search result items or hits is preferably within an acceptable range (i.e., within the upper and lower limits). In addition, there are timeouts and network constraints to consider. For instance a search service provider 100 could fail to provide results. In which case the query string will be returned to the query builder 310 to select a different search service provider 100.

When the optimal query string is computed, it is stored in the local query database 120, at step 435. Also, a request to the summary marker 330 is forwarded along with the query string, to incorporate the final query string with the keyword in the abstract of the search result item, at step 440.

At this stage, an optimal query string has been computed from the search result calibration manager 320, and stored in the local query database 120 using the URL and the keywords as the primary index keywords for subsequent retrieval. One feature of the present invention is to update the search engine repository 210 at step 445, to reflect the changes in the abstracts. More particularly, the abstract of this particular URL can be modified as follows:

As a first scenario, consider that there were no prior modifications to the search engine repository 210 made by the summary marker 330. All occurrences of the keyword need to be marked using an available markup language (i.e., HTML), which involves having the summary marker 330 include markup tags before and after each occurrence of the keyword. The next step is to insert a hyperlink at each marked position that contains the computed query string. The following example will help elucidate this scenario.

The text of the abstract revealed by the above hypothetical query to search for documents related to "RMI" in jCentral® is: "RMI is a Java specific technology that allows the development of distributed applications and offers numerous advantages over CORBA . . . ", with the keywords "RMI" and "CORBA" underlined.

The URL of the resource associated with the first keyword "RMI" is: http://www.mysite.com/example.htm. The computed (URL, keyword) pair is stored, as follows: (http://www.mysite.com/example.htm, RMI), and is used as the primary keyword in the local query database 120. The computed query string: "http://www.hotbot.com/?MT=java+rmi+remote+method+invocation&SM=MC&DV=0&L G=any&DC=10&DE=2& v=2&OPs=MDRTP" is then stored under the foregoing primary keyword.

At this stage, the summary marker 330 makes the following change to the specific item in the sear ch engine repository 210. First, the keyword "RMI" occurs only once in the abstract. Thus, it will be marked only once, using the following exemplary markup: "<START_KW_ASS>RMI</START_KW_ASS> is a Java specific technology which allows development of distributed applications and offers numerous advantages over CORBA . . . " This tag is used to mark the beginning and the end of a selected keyword.

The next step is to insert the computed query string as a hyperlink. The finished result may be expressed as follows: "<START_KW_ASS><A HREF="http://www.hotbot.com/?MT=java+rmi+remote+method+invocation&SM=MC&D V=0&LG=any&DC=10&DE=2&_v=2&OPs=MDRTP" ALT="RMI">RMI</A></START_KW_ASS> is a Java specific technology which allows development of distributed applications and offers numerous advantages over CORBA . . . "

Considering now a second scenario, wherein the keyword is already marked in the abstract, and a computed query string is already computed in the form of a hyperlink. This scenario can occur because of an update to the search engine repository 210. For instance, the search service provider 100 is no longer available, the content of the abstract has changed, or the query string has been optimized. In this case the summary marker erases the previous hyperlink and inserts the new link as described above.

Therefore, the summary marker 330 updates the abstract of the selected URL in the search engine repository 210, and marks and inserts the computed query string for all occurrences of each keyword.

The search engine repository 210 contains all the summary metadata to be searched. This database is managed by the search service provider 100. Changes to this database are posted to the synchronization unit 340. It is one aspect of the present invention to write and update access to the abstract keywords association system 10, in order to retrieve and update the abstract data.

The local query database 120 is maintained by the abstract keywords association system 10. It uses the URL and a specific keyword as a primary key to retrieve a query string that was previously generated by the query builder 310.

The domain-specific dictionary 110 is a database that contains all domain specific keywords that can be searched. The domain-specific knowledge needs to be provided manually when the abstract keywords association system 10 is setup. Each keyword is associated with a list of synonyms and related words that can be used to query string modifications as explained earlier.

A separate search engine provider database can be used to supplement the local query database 120. The search engine provider database would contain all the available search service providers are stored, along with corresponding schemes on how to query these search service providers. The search engine provider database might need to be maintained manually.

FIG. 6 is comprised of FIGS. 6A, 6B, and 6C, and represents three exemplary screen views that illustrate a hypothetical search using the abstract keywords association system 10. With reference to FIG. 6A, the user enters the desired query, and the search service provider 100 returns the search results with selected domain-specific terms, for example RMI, underlined.

With reference to FIG. 6B, the user, desiring to learn more about a domain-specific term RMI, selects this term, and a new browser window 400 appears and displays the search result for the term RMI. It should be noted that the user was not required to type in a new query for the term RMI. Rather, a query string was executed as explained earlier.

With reference to FIG. 6C, if the browser window 400 contains another domain-specific term of interest to the user, for example "objects", the user selects this term and another browser window 402 appears and displays the search result for the term "object".

It is to be understood that the specific embodiments of the invention that have been described are merely illustrative of certain application of the principle of the present invention. Numerous modifications may be made to the abstract update system and associated method described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system for use with a search engine and a search engine repository to dynamically associate a keyword encountered in an abstract of a search result item with a domain-specific search query string, comprising:
    a query builder for automatically building the domain-specific search query string;
    a local query database for storing the domain-specific search query string;
    a synchronization unit for synchronizing the search engine repository and the local query database to update the domain-specific search query string; and
    a summary marker for incorporating the domain-specific search query string, in association with the keyword, in the abstract of the search result item.

2. The system as recited in claim 1, further including a keyword detector for generating a list of keywords included in a domain-specific dictionary; and
    wherein the keyword in the abstract of the search result item is included in the domain-specific dictionary.

3. The system as recited in claim 2, further including a search result item buffer that receives a request for processing an abstract metadata item from the synchronization unit.

4. The system as recited in claim 3, wherein the request includes a link and a corresponding abstract.

5. The system as recited in claim 4, wherein the link includes a Universal Resource Locator (URL).

6. The system as recited in claim 2, wherein a user query generates a number of query result items; and
    further including a search result calibration manager for calibrating the number of query result items.

7. The system as recited in claim 6, wherein if the number of query result items is excessive, the user query is automatically resubmitted to the query builder along with a request to refine the user query.

8. The system as recited in claim 7, wherein if the number of query result items is lower than a designated minimum, the user query is automatically resubmitted to the query builder along with a request to broaden the user query.

9. The system as recited in claim 5, wherein the query builder uses a (URL, keyword) pair to build the domain-specific query.

10. The system as recited in claim 9, wherein the summary marker updates the abstract corresponding to the Universal Resource Locator in the search engine repository, and marks and inserts the domain-specific query for all occurrences of the keyword.

11. A computer program product for use with a search engine and a search engine repository to dynamically associate a keyword encountered in an abstract of a search result item with a domain-specific search query string, comprising:
    a query builder for automatically building the domain-specific search query string;
    a local query database for storing the domain-specific search query string;
    a synchronization unit for synchronizing the search engine repository and the local query database to update the domain-specific search query string; and
    a summary marker for incorporating the domain-specific search query string, in association with the keyword, in the abstract of the search result item.

12. The computer program product as recited in claim 11, further including a keyword detector for generating a list of keywords included in a domain-specific dictionary; and
    wherein the keyword in the abstract of the search result item is included in the domain-specific dictionary.

13. The computer program product as recited in claim 12, further including a search result item buffer that receives a request for processing an abstract metadata item from the synchronization unit.

14. The computer program product as recited in claim 13, wherein the request includes a link and a corresponding abstract.

15. The computer program product as recited in claim 14, wherein the link includes a Universal Resource Locator.

16. The computer program product as recited in claim 12, wherein a user query generates a number of query result items; and
    further including a search result calibration manager for calibrating the number of query result items.

17. The computer program product as recited in claim 16, wherein if the number of query result items is excessive, the user query is automatically resubmitted to the query builder along with a request to refine the user query.

18. The computer program product as recited in claim 17, wherein if the number of query result items is lower than a designated minimum, the user query is automatically resubmitted to the query builder along with a request to broaden the user query.

19. The computer program product as recited in claim 15, wherein the query builder uses a (URL, keyword) pair to build the domain-specific query.

20. The computer program product as recited in claim 19, wherein the summary marker updates the abstract corresponding to the Universal Resource Locator in the search engine repository, and marks and inserts the domain-specific query for all occurrences of the keyword.

21. A method for use with a search engine and a search engine repository to dynamically associate a keyword encountered in an abstract of a search result item with a domain-specific search query string, comprising:

automatically building the domain-specific search query string;

storing the domain-specific search query string in a local query database;

synchronizing the search engine repository and the local query database to update the domain-specific search query string; and incorporating the domain-specific search query string, in association with the keyword, in the abstract of the search result item.

22. The method as recited in claim 21, further including generating a list of keywords included in a domain-specific dictionary; and wherein the keyword in the abstract of the search result item is included in the domain-specific dictionary.

23. The method as recited in claim 22, further including receiving a request for processing an abstract metadata item.

24. The method as recited in claim 23, wherein receiving the request includes receiving a link and a corresponding abstract.

25. The method as recited in claim 24, wherein receiving the link includes receiving a Universal Resource Locator.

26. The method as recited in claim 22, wherein a user query generates a number of query result items; and further including calibrating the number of query result items.

27. The method as recited in claim 25, further including using a (URL, keyword) pair to build the domain-specific query.

28. The method as recited in claim 27, further including updating the abstract corresponding to the Universal Resource Locator in the search engine repository, and marking and inserting the domain-specific query for all occurrences of the keyword.

* * * * *